Patented Jan. 5, 1954

2,665,192

UNITED STATES PATENT OFFICE 2,665,192

PROCESS FOR THE PRODUCTION OF CUPROUS OXIDE

Percy John Rowe, Martinez, Calif., assignor to The Mountain Copper Company, Ltd., a corporation of Great Britain No Drawing. Application January 23, 1951, Serial No. 207,423

5 Claims. (Cl. 23—147)

This invention relates to the manufacture of cuprous oxide of such high purity and fine division as to be highly useful in industry and agriculture.

Briefly, the process of the present invention includes the reaction, in the presence of water, of sulfur dioxide and a basic copper compound composed generally of copper hydroxide. The sulfur dioxide reduces the basic copper from the cupric to the cuprous state, a solid basic copper sulphite being formed along with an acid solution which is in part sulfurous acid and in part sulfuric acid. The basic copper sulphite forms a slurry in the solution; upon heating, the solid is converted into cuprous oxide, the heating resulting in the further reduction of any cupric copper present to cuprous copper with formation of more sulfuric acid, this in turn increasing the acidity of the solution and dissolving additional cupric copper which is present and which is not reduced to provide a solution of cupric sulphate. Continued heating results in the complete decomposition of the basic copper sulphite to copper oxide and a solution of cupric sulphate, any sulfur dioxide present being expelled from the solution.

When the acidity of the solution is maintained within certain limits, as will be presently explained, the resulting cuprous oxide product is of a high purity and of a controlled particle size. I am able to produce directly cuprous oxide having a purity of better than 99% as $Cu_2O$ and a particle size ranging from that of a cuprous oxide of 1 micron and smaller and of a yellow-orange color to a cuprous oxide containing particles 10 microns and larger and of a purple-red color.

It is preferred to operate at temperatures above 50° C. because in the range of 15°–50° C., the sulfurous acid does not react as completely as is desired with the alkaline copper. However, in any given slurry containing a measured amount of alkaline copper and sulfur dioxide, as the temperature is increased the sulfur dioxide reduces the cupric copper to cuprous copper, the sulfur dioxide being oxidized in turn to sulfur trioxide, the acidity of the solution gradually increasing. At temperatures up to 70° C. this increase in acidity is gradual while above 70° C. and up to the boiling point of the solution under atmospheric pressure or higher, as in a closed system, the rate of the reaction is greatly accelerated and the acid concentration increases rapidly.

I have determined that the acidity of the solution should not exceed an acidity equivalent to a concentration of about 12 grams per liter of sulfuric acid to prevent conversion of cuprous oxide into metallic copper and cupric copper sulfate. Additionally, the final acidity of a solution should not be less than that equivalent to about 1 gram per liter of sulfuric acid, to assure that all of the cupric copper present is converted to the oxide.

Various products can be secured depending upon the acidity of the solution and the temperature to which the basic copper sulphite is heated. For example, heating the slurry up to 70° C. in an acid solution of about pH 6 to pH 5, then continuing the heating up to the boiling point under atmospheric pressure in an acid solution which does not exceed about 12 grams per liter of sulfuric acid with the final acidity between about 1 and 12 grams per liter of sulfuric acid, a cuprous oxide product of high purity is obtained which is essentially free of metallic or cupric copper, is of a yellow-orange color, and is very finely divided, e. g. of the order of 1 micron. When the same operation is carried on with a solution of about pH 3.5 to about pH 3.0, conditions being otherwise the same, one obtains a cuprous oxide product of high purity, essentially free of metallic or cupric copper, but of a purple or deep red color and of a relatively large particle size, e. g. of the order of 10 microns. When the basic copper sulphite slurry is heated slowly in the intermediate ranges, that is, between about pH 3.5 and about pH 5.0, the conditions otherwise being the same, the particle size of the cuprous oxide is intermediate those mentioned while the color varies from orange to rose red, the more acid solution producing the rose red color, while the less acid solution produces the orange color.

It is desirable to employ at least 60% of the sulfur dioxide required stoichiometrically to reduce all the cupric copper to cuprous copper because, when less than 60% of this quantity is employed, the yield of cuprous oxide is correspondingly reduced, the remaining copper entering the solution as cupric sulphate.

When 90% and even an excess of sulfur dioxide is employed, the yield of cuprous oxide is from 85% to 90% of the total starting cupric copper, the remainder entering the solution as cupric sulphate. The use of an excess of sulfur dioxide is generally undesirable, inasmuch as additional alkali is required to maintain the acidity of the solution within the range specified.

The process of the invention will become further apparent from the following examples which are set forth by way of illustration and not by way of limitation.

*Example 1.*—4,400 pounds of copper as basic copper sulphate were added to sufficient water to make up a slurry of a volume of 4,000 gallons. This was added to a cylindrical wooden stave tank having a bottom discharge and a wooden cover equipped with an exhaust pipe for the expelling of gases; the tank included an agitator to keep the slurry solids in suspension and steam coils for heating.

1,800 pounds of sodium hydroxide were added as a 50% solution to provide an alkaline copper solution having a pH of 11.9. Sulfur dioxide was then fed into the slurry, 2,000 pounds being added over a period of two hours, a precipitate of basic copper sulphite forming in the solution. Heat was then added by passing steam through the steam coils until the temperature was raised from 49° C. to 96° C. The acidity of the solution was checked during the heating and as the temperature increased, the acid concentration gradually increased. When the acid concentration reached that equivalent to 3 grams per liter of sulfuric acid, additional sodium hydroxide was added to maintain the acidity between 3 to 8 grams per liter until completion of the run; 650 pounds of caustic soda were required for this and were added over a period of 25 minutes.

The pH, temperature and acidity as grams per liter of sulfuric acid are shown in the following table:

TEST A

| pH | Temperature ° C. | Acidity |
|---|---|---|
| 5.5 | 49 | |
| 5.0 | 64 | |
| 4.9 | 72 | |
| 4.0 | 78 | |
| 4.0 | 84 | |
| 3.9 | 90 | |
| 3.8 | 96 | |
| NaOH added 650 lbs., 3.1 | 98 | 3 |
| NaOH added 650 lbs., 3.0 | 100 | 5 |
| NaOH added 650 lbs., 2.8 | 100 | 8 |
| 3.0 | 99 | 5 |
| 3.0 | 100 | 5 |
| 3.0 | 100 | 5 |

Heating was continued at 100° C. for another hour to assure completion of the reaction and the precipitate was then allowed to settle. The copper sulphate liquor was decanted into another tank and treated with sodium hydroxide to reduce the pH to 6.8 and enable the copper to recover as basic copper sulphate. The clear solution containing sodium sulphate was discarded.

The precipitate thus recovered from the tank was washed, filtered and dried. The total yield was 4,300 pounds; it analyzed 99.4% $Cu_2O$ and was a yellow-orange color of very fine particle size, all of the order of 1 micron.

*Example 2.*—The procedure of Example 1 was followed, except only 1,000 pounds of sodium hydroxide were added initially, the alkalinity of the solution being that of pH 9.5. A ton of sulfur dioxide was then added over a period of time to reduce the pH of the solution to 4.2; the solution then had a temperature of 43° C. Heating was continued as in Example 1 and when the acidity of the solution required addition of alkali, 1,475 pounds of NaOH were added over 30 minutes to maintain the acidity below that equivalent to 12 grams per liter of sulfuric acid. The pH, temperature and acidity as grams per liter of sulfuric acid are shown in the following table:

TEST B

| pH | Temperature ° C. | Acidity |
|---|---|---|
| 4.2 | 43 | |
| 4.0 | 60 | |
| 3.9 | 70 | |
| 3.9 | 76 | |
| 3.8 | 82 | |
| 3.7 | 86 | |
| 3.4 | 91 | |
| 3.3 | 95 | |
| NaOH added 1,475 lbs., 3.1 | 97 | 3 |
| NaOH added 1,475 lbs., 2.0 | 100 | 7 |
| NaOH added 1,475 lbs., 2.8 | 99 | 8 |
| NaOH added 1,475 lbs., 2.9 | 100 | 7 |
| NaOH added 1,475 lbs., 3.0 | 100 | 5 |
| 3.0 | 100 | 5 |

The solution was then finished as in Example 1, 4,350 pounds of cuprous oxide being recovered of a bright red color, analyzing 99.6% $Cu_2O$ and a fineness of about 2–3 microns.

As a starting material, one can employ any water soluble copper compound which does not include any component incompatible with the subsequent reactions. The preferred starting material is the basic copper ammonium sulfate product of my co-pending application Serial No. 671,485, filed December 27, 1948, and now Patent No. 2,536,096; this is treated with sulfuric acid to form tribasic copper sulfate which is utilized to make the initial solution. Any copper compound can be utilized to provide the copper hydroxide starting material. Further, under some conditions it is desirable to separate the solid copper hydroxide, wash it and then treat it in the presence of water with sulfur dioxide; it is not essential to maintain the alkaline solution in contact with the copper hydroxide as in Examples 1 and 2. Thus, one can use copper nitrate, copper chloride, copper sulfate, copper carbonate, basic sulfates and ammoniacal sulfates as the source of copper for the copper hydroxide.

From the foregoing, it will be apparent that I have provided an improved process for the manufacture of cuprous oxide of high purity and fine particle size. Further, the product is characterized by having an inherent high degree of stability as evidenced by its low rate of reversion under adverse conditions of high humidity and temperature as compared to cuprous oxides made by other methods and which usually require a stabilizer to afford adequate reversion resistance.

I claim:

1. A process for production of finely divided cuprous oxide comprising adding sulfur dioxide to an alkaline aqueous slurry of finely divided solid cupric hydroxide in an amount sufficient to convert cupric hydroxide to solid cuprous sulfite in an acid aqueous slurry, and heating at a temperature of from 15° to 70° C. the so formed solid cuprous sulphite in the acid aqueous slurry having an acidity between the equivalent of 1 to 12 grams per liter of sulfuric acid to decompose the sulfite to finely divided cuprous oxide substantially free of metallic copper.

2. A process for production of finely divided cuprous oxide comprising adding sulfur dioxide to an alkaline aqueous slurry of finely divided solid cupric hydroxide in an amount equal to at least 60% of that required to reduce the cupric copper present and form an aqueous acid slurry containing solid basic cuprous sulphite, the slurry being at a temperature between about 15° C. and about 70° C., heating the so formed solid basic cuprous sulphite in the acid slurry while maintaining the slurry between the equivalent of one to twelve grams per liter of sulfuric acid to decompose the sulfite and form finely divided cuprous oxide substantially completely, and recovering the solid cuprous oxide from the slurry.

3. A process for production of finely divided cuprous oxide comprising adding sulfur dioxide to an alkaline aqueous slurry of finely divided solid cupric hydroxide in an amount sufficient to form solid cuprous sulfite and form an acid aqueous slurry, at a temperature of about 50° C., and heating the so formed solid cuprous sulphite in the thus formed acid aqueous slurry having an acidity between the equivalent of 1 to 12 grams per liter of sulfuric acid to decompose the sulfite to finely divided cuprous oxide substantially free of metallic copper.

4. A process for production of finely divided cuprous oxide comprising adding sulfur dioxide to an alkaline aqueous slurry of finely divided solid cupric hydroxide in an amount equal to at least 60% of that required to reduce the cupric copper present and form solid basic cuprous sulphite in an acid aqueous slurry, the slurry being at at temperature between about 15° C. and about 70° C., heating the so formed solid basic cuprous sulphite to a temperature of about 100° C. in the acid slurry while maintaining the slurry between the equivalent of one to twelve grams per liter of sulfuric acid to decompose the sulfite and form finely divided cuprous oxide substantially completely, and recovering the solid cuprous oxide from the slurry.

5. A process for production of finely divided cuprous oxide comprising adding sulfur dioxide to an alkaline aqueous slurry of finely divided solid cupric hydroxide in an amount sufficient to form solid cuprous sulfite and form in an aqueous acid slurry, at a temperature of about 50° C., and heating the so formed solid cuprous sulphite to a temperature of about 100° C. in the acid aqueous slurry having an acidity between the equivalent of 1 to 12 grams per liter of sulfuric acid to decompose the sulfite to finely divided cuprous oxide substantially free of metallic copper, and recovering the cuprous oxide.

PERCY JOHN ROWE.

References Cited in the file of this patent

UNITED STATES PATENTS

| Number | Name | Date |
|---|---|---|
| 1,147,466 | Van Arsdale | July 20, 1915 |
| 1,358,619 | Christensen | Nov. 9, 1920 |
| 2,385,066 | Du Rose | Sept. 18, 1945 |
| 2,385,078 | Harshaw | Sept. 18, 1945 |
| 2,409,413 | Becker | Oct. 15, 1946 |
| 2,474,497 | Rowe | June 28, 1949 |
| 2,474,533 | Klein | June 28, 1949 |

OTHER REFERENCES

Gmelin-Kraut's "Handbuch der Anorganischen Chemie," Band V, Abt. 1, page 727. Heidelberg, 1909.

J. W. Mellor's "A Comprehensive Treatise on Inorganic and Theoretical Chemistry," vol. 3, 1923 ed., page 119, and vol. 10, 1930 ed,. pp. 274, 275, 278. Longmans, Green and Co., N. Y.